United States Patent [19]

Harms et al.

[11] Patent Number: 4,928,042
[45] Date of Patent: May 22, 1990

[54] CIRCUIT ARRANGEMENT FOR OPERATING A MULTI-PHASE SYNCHRONOUS MOTOR ON A DIRECT-VOLTAGE SYSTEM

[75] Inventors: Klaus Harms, Vaihingen/Enz; Hans-Dieter Schray, Markgröningen; Bernd Taubitz, Schwieberdingen; Rainer Wirtz, Markgröningen, all of Fed. Rep. of Germany

[73] Assignee: Robert Bosch GmbH, Stuttgart, Fed. Rep. of Germany

[21] Appl. No.: 272,881
[22] PCT Filed: Mar. 12, 1986
[86] PCT No.: PCT/DE87/00109
  § 371 Date: Aug. 31, 1988
  § 102(e) Date: Aug. 31, 1988
[87] PCT Pub. No.: WO87/05756
  PCT Pub. Date: Sep. 24, 1987

[30] Foreign Application Priority Data

Mar. 22, 1986 [DE] Fed. Rep. of Germany ....... 3609826

[51] Int. Cl.$^5$ ............................................. H02K 29/00
[52] U.S. Cl. ................................... 318/254; 318/138; 318/439
[58] Field of Search ............... 318/138, 254, 439, 722, 318/723

[56] References Cited

U.S. PATENT DOCUMENTS

| 3,931,562 | 1/1976 | Visscher | 318/254 |
| 4,162,435 | 7/1979 | Wright | 318/254 |
| 4,262,237 | 4/1981 | Glenius | 318/254 |
| 4,431,953 | 2/1984 | Schray et al. | 318/254 |
| 4,446,406 | 5/1984 | Uzuka | 318/254 |

Primary Examiner—David Smith, Jr.
Attorney, Agent, or Firm—Michael J. Striker

[57] ABSTRACT

In a circuit arrangement for operating a multiphase synchronous motor (10) on a direct current voltage main current valves (15-18), which are successively actuated via a ring counter (38), are connected in series with the phases ($w_1$-$w_4$) of the armature winding (12) of the motor (10). A ring counter switching device (19) advances the ring counter (38) by pulses derived from the comparison of in voltages dropped across two blocked current valves (15-18). To restrict the self control range of the motor to an angular range which is much smaller than half a period, of the voltage drop decreasing in the course of time is additionally compared with a set voltage (k $U_S$) by the ring counter switching device (19) and the ring counter advancement is enabled only for as long as this voltage drop is greater than the set voltage value.

18 Claims, 3 Drawing Sheets

CIRCUIT ARRANGEMENT FOR OPERATING A MULTI-PHASE SYNCHRONOUS MOTOR ON A DIRECT-VOLTAGE SYSTEM

PRIOR ART

The invention is based on a circuit arrangement for operating a multi-phase synchronous motor on a direct current (d.c.) voltage mains, the synchronous motor having a number n of phases of its armature winding, and the arrangement including the number n of current valves connected respectively in series with the phases of the armature winding to the d.c. voltage mains, a ring counter having a counting input and the number n of parallel counting outputs each connected to the control input of an assigned current valve to drive successively the current valves into conduction during phase angle ranges which are approximately equal to 360°/n.

In a known circuit arrangement of this type (German Offenlengungsschrift 3,042,819), the alternating voltages induced in the phases of the armature winding which are not connected are measured by the ring counter switching device and the ring counter is advanced and a phase of the armature winding is thus connected by actuating the corresponding current valve approximately symmetrically with respect to the crest of the negative half wave of the induced alternating voltage. The times for advancing the ring counter and thus for connecting or disconnecting the individual winding phases of the armature winding are determined by comparing the voltages induced in the winding phases not connected. For this purpose, the ring counter switching device exhibits, in a synchronous motor having an n-phase armature winding, n being an even number, an edge-triggered monostable flipflop which, following a trigger signal, generates at its input a counting pulse for the ring counter, and a comparison circuit which generates a trigger signal for the monostable flipflop whenever the voltage at the blocked armature winding which is offset by half an electric period with respect to the armature windings for which current flows, exceeds the voltages across the armature winding which directly lags or cyclically follows this armature winding. Due to the stepping on of the ring counter, this blocks again the momentarily opened current valve and opens a next current valve as a result of which in each case one phase of the armature winding is disconnected and the next following phase is connected. As has been mentioned, the respective winding phase is connected approximately symmetrically with respect to the crest of the negative half wave of the alternating voltage induced in the respective winding phase so that in a for example four-phase synchronous motor having the four voltages $U_1$, $U_2$, $U_3$ and $U_4$ dropped across the blocked current valves, the first current valve opens for as long as $U_3$ is greater than $U_2$ and greater than $U_4$, the second current valve is conductive for as long as $U_4$ is greater than $U_3$ and greater than $U_1$, the third current valve is conductive for as long as $U_1$ is greater than $U_4$ and greater than $U_2$ and, finally, the fourth current valve opens for as long as $U_2$ is greater than $U_1$ and greater than $U_3$. The connecting conditions of the current valves, that is to say $U_1$ greater than $U_4$ or $U_2$ greater than $U_1$ or $U_3$ greater than $U_2$ or $U_4$ greater than $U_3$ for one of the four current valves in each case exists in this arrangement over an electrical phase angle of 180° which means that the switch-over condition occurs after 90° of forward or 90° of reverse rotation in each case. As a result, the motor can also start against the required direction of rotation and, although with reduced torque, without electric braking effect, after being correspondingly excited, for example due to a disadvantageous starting position or after the direction of rotation has been switched over.

Since no information on its position exists when the rotor or armature is standing still, an auxiliary pulse generator is provided in the known circuit arrangement. This auxiliary pulse generator starts the ring counter for starting up the motor and advances it in very slow steps of, for example 0.5 sec so that the rotor can be reliably aligned. As soon as direction of rotation, current of the ring counter and voltage intersections ($U_1 > U_4$, $U_2 > U_1$, and so forth) fit together, the synchronous motor passes into self-control mode and accelerates with maximum torque up to its operating speed. In the worst case, this circuit arrangement results in a start delay of more than 1 sec.

This delay in motor starting is not acceptable for particular applications of the synchronous motor, for example when it is used as fuel pump on injection-type engines. To obtain an undelayed start, a so-called repositioning has been provided in which, when the motor is stopped, the rotor is placed into a defined position from which a new start can take place without delay. This repositioning requires time-delayed switch-off of the supply voltage and an additional control input for the switching-off information of the motor.

ADVANTAGES OF THE INVENTION

The circuit arrangement according to the invention, comprising a ring counter switching device which compares voltage drops across two blocked current valves, the first voltage drop being in opposite electrical phase to the alternating voltage induced in the phase of the armature winding which is connected to the currently conducting current valve, and the second voltage drop being in opposite electrical phase to the alternating voltage induced in the phase of the armature winding which is connected to the subsequent current valve when viewed in the direction of rotation of the motor, the ring counter switching device generating a counting pulse when the second voltage drop is greater than the first voltage drop; means for deriving a set voltage value ($k \cdot U_s$) from the direct current voltage of the mains; and means for delivering the counting pulse to the ring counter for as long as the first voltage drop is greater than the set voltage value ($k \cdot U_s$), has the advantage that the range of advance of the ring counter is reduced to a much smaller range of electrical phase angle. In a circuit arrangement for an n-phase synchronous motor according to claim 6, n being an even number, this range of advance of the ring counter is reduced to slightly less than 45° of electrical phase depending on the size of k selected. Factor k is empirically determined and matched to the mass moment of inertia of the rotor of the synchronous motor. This fixes the self-control of the motor to this limited angular range. If the rotor, after switch-on, oscillates in the forward direction, a stepping-on of the ring counter is triggered, provided the switching conditions exist, as a result of which the rotor is accelerated in the correct direction of rotation. If the rotor oscillates in the reverse direction and the said conditions exist, the ring counter is also stepped on in the forward direction. This causes the rotor to be braked. Overall, the synchronous motor develops maximum drive or torque in the required direction of running due to the circuit arrangement according to the invention. Rapid reverse running is effectively retarded.

In an advantageous embodiment of the invention is obtained from Claim 3. An auxiliary counting pulse generator generates, if the range of self-control is not reached, for example if no significant voltage is induced in the armature winding due to standstill or very slow forward and reverse motion of the rotor, an additional counting pulse which steps the ring counter on by one step until the self-control range is reached. The predetermined waiting time is restarted whenever the state of the ring counter has just changed and runs for as long as the state of the ring counter does not change. These measures enable the synchronous motor to start rapidly from standstill without the requirement of repositioning the rotor after the motor has been switched off. During start-up, the synchronous motor virtually behaves like a conventional direct-current motor. The maximum start-up delay up until the self-control range has been reached is less than the run-up time of the motor if the constant k and waiting time are correctly dimensioned.

An advantageous embodiment of the invention is provided for a synchronous motor having an even number of winding phases in the armature winding.

In other advantageous embodiments of the invention due to these measures, the auxiliary trigger signal generator is blocked for as long as the rotor is turning with a minimum speed within a limited angular range. This suppresses the auxiliary trigger signal because stepping-on of the ring counter in this range is harmful for forward running and does not retard any reverse run which may be present.

Another embodiment of the invention has the effect that the interference voltages occurring when the winding phases are switched over do not lead to any unintentional stepping-on of the ring counter before the next defined switch-over condition has been reached.

Due to the multiplexers in the ring counter switching device the circuit expenditure of the comparison device can be restricted to only a few comparators which are progressively supplied with the comparison voltages needed in each case.

This switching device enables the direction of rotation of the rotor of the synchronous motor to be changed. In a four-phase armature winding, the inputs of the multiplexers connected to the inputs of the current valves belonging to the even-numbered or to the odd-numbered winding phases of the armature winding are exchanged with each other in the switch-over position of the changeover switches. At the same time, the connection to the ring counter of the control inputs of the corresponding current valves belonging to the even-numbered or odd-numbered winding phase of the armature winding are exchanged with each other. The direction of rotation can be reversed while the motor is running, the motor being actively decelerated and subsequently continuing to run in the reverse direction of rotation.

DRAWING

In the description following, the invention is explained in greater detail with the aid of exemplary embodiments shown in the drawing, in which:

FIG. 1 shows a basic circuit diagram of a four-phase synchronous motor with a circuit arrangement for operating the synchronous motor on a direct current voltage mains, FIG. 2 shows a diagram of the voltage drop variations of the across current valves of the circuit arrangement, FIG. 3 shows a block diagram of a control block for driving the current valves in the circuit arrangement of FIG. 1, FIG. 4 shows a block diagram of a part of a ring counter switching device in the control block in FIG. 1 in accordance with another exemplary embodiment.

DESCRIPTION OF THE EXEMPLARY EMBODIMENTS

Figure 1:
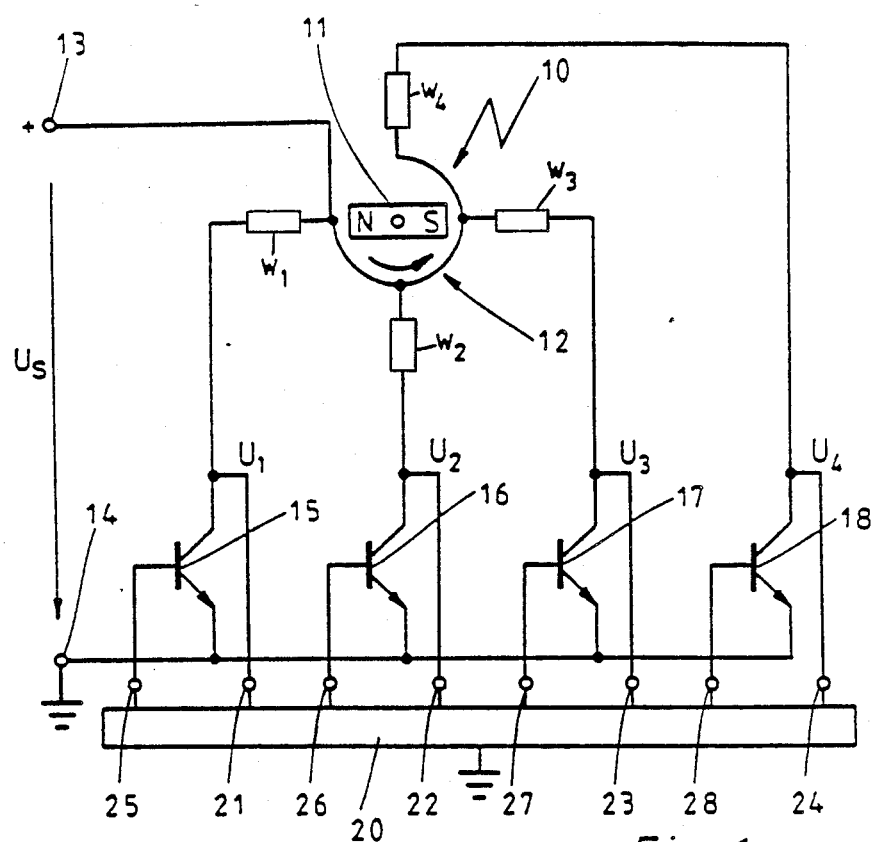
Figure 2:
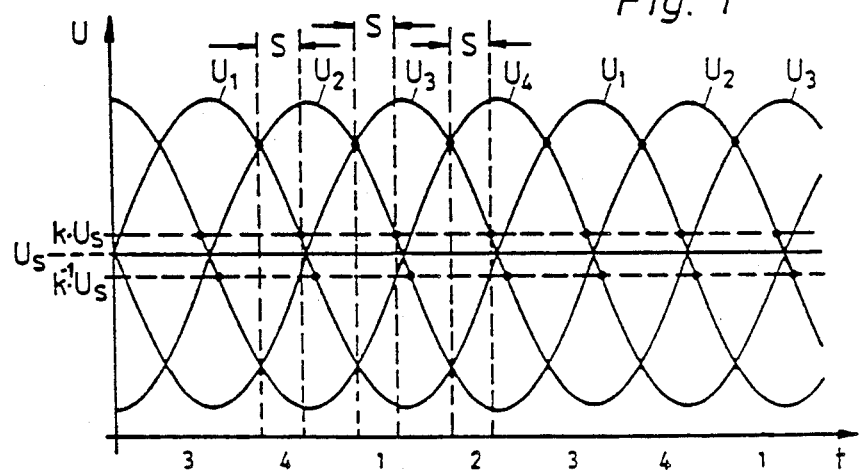

In the basic circuit diagram shown in FIG. 1, the synchronous motor is designated by 10. It exhibits a two-pole rotor 11 which is equipped with permanent magnets and which rotates in the direction of the arrow in a stator in which a four-phase armature winding 12 consisting of winding phases $w_1$–$w_4$ is accommodated. One winding end of the winding phases $w_1$–$w_4$ is connected to the positive potential 13 of a mains direct current voltage $U_S$. Current valves constructed here as power transistors 15–18 are connected in series with the associated winding phases $w_1$–$w_4$, the emitters of the power transistors 15–18, which in this example are npn transistors, being connected to the zero or negative potential 14 of the mains direct current voltage $U_S$. Thus, the series circuits each consisting of one winding phase and one power transistor are connected to the system direct current voltage $U_S$. For controlling the power transistors 15–18, a control block 20 is provided having four inputs 21–24 which are connected to the collectors of the power transistors 15–18 and four outputs 25–28 which are connected to the bases of the power transistors 15–18. The voltage $U_1$–$U_4$ across the power transistors 15–18 are present at inputs 21–24. Time variation of these voltages $U_1$–$U_4$ with blocked power transistors 15–18 is shown in FIG. 2. It represents the sum of the armature voltages induced in each of the winding phases $w_1$–$w_4$ and the mains direct current voltage $U_S$.

Figure 3:
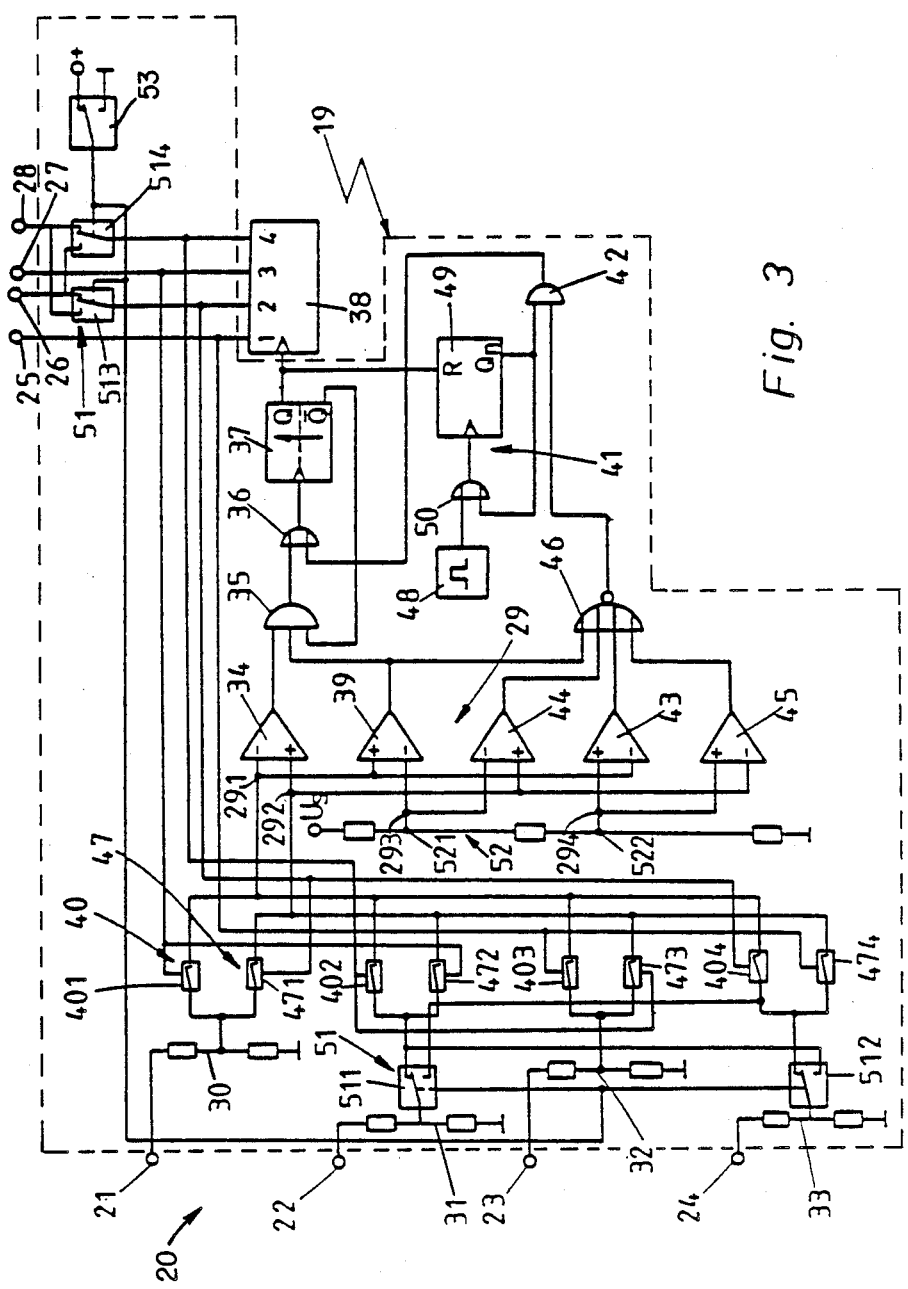

The control block 20 is shown in the block diagram in FIG. 3. The inputs 21–24 of the control block 20 are respectively connected to voltage dividers 30–33. The divider taps of the voltage dividers 30–33 are each connected to the input of the individual switches 401, 402, 403 and 404 of a first multiplexer 40 and to the input of individual switches 471, 472, 473 and 474 of a second multiplexer 47. Between the divider tap of the voltage dividers 31 and 33 and the inputs of the associated individual switches 402, 472 and 404, 474 are connected respectively, change-over switch 511 and 512, belonging to a rotation reversing switching device 51 illustrated. In the switching position the change-over switches 511 and 512 establish the connections between divider taps and the individual switches 402, 472 and 404, 474. In their switch-over position, the connections of the individual switches 402, 472, 404, 474 are exchanged for each other so that the divider tap of the voltage divider 31 is connected to the inputs of the individual switches 404, 474 and the divider tap of the voltage divider 33 is connected to the inputs of the individual switches 402 and 472. The rotation reversing switching device 51 also includes two further change-over switches 513 and 514, the integration of which into the circuit diagram of control block 20 will be described later.

The voltage dividers 30, 33 and multiplexers 40, 47 are a part of a ring counter switching device 19 which also includes a comparison device 29 having four comparison inputs 291–294, an edge-triggered monostable flipflop 37 which is connected via a first gate constructed as AND gate 35 to the comparison device 29, the device controls a ring counter 38, the counting input of which is connected to the Q output of the monostable flipflop 37. The first comparison input 291 of the comparison device 29 is connected to the output of the multiplexer 40, the second comparison input 292 is connected to the output of the multiplexer 47, the third comparison input 292 is connected to a first divider tap 521 of another voltage divider 52 and the fourth comparison input 294 is connected to a second divider tap 522 of the voltage divider 52. The voltage divider 52 is connected to the mains direct current voltage $U_S$ and the divider taps are adjusted in such a manner that, at the first divider tap 521, a voltage is picked up which corresponds to the k/s times the value of the direct current voltage $U_S$ and at the second divider tap 522 a voltage is picked up which is equal to 1/k.s-times the direct current voltage $U_S$.

The ring counter 38, using a 1-of-4 shifting code, has four parallel counting outputs 1–4 which, on the one hand, are connected to the outputs 25–28 of the control block 20 and, on the other hand, are connected to the control inputs of the individual switches 401–404 and 471–474, respectively, of the multiplexers 40 and 47. One change-over switch 513 and 514, respectively, of the reversal rotation reversing switching device 51 is arranged in each case in the lines leading from the counting outputs 2 and 4 to the outputs 26 and 28 of the control block 20. In the illustrated switching positions, the change-over switches 513 and 514 connect the counting output 2 to the output 26 and the counting output 4 to the output 28. In their switched-over position, the two change-over switches 513 and 514 exchange the connection of counting outputs 2 and 4 such that the counting output 4 is connected to the output 26 and the counting output 2 is connected to the output 28. All change-over switches 511–514 are synchronously switched over by means of a control switch 53.

The divider taps of the voltage dividers 30–33 are adjusted in such manner that 1/s-times the voltages $U_1$–$U_4$ across the respective current valves 15–18 are picked up at the divider taps and fed to the multiplexers 40–47. The two multiplexers 40, 47 are synchronously controlled in such a manner that their inputs, connected to the same voltage dividers 30–33, multiplexers 40, 47 are mutually displaced by one input in the switching sequence so that in each case voltages are present at the outputs of the two multiplexers 40, 47 which are electrically in phase by 90° with respect to tone another. As a result, the multiplexers 40, 47 are controlled by the ring counter 38 in such a manner that at the output of the first multiplexer 40, and thus at the first comparison input 291 of the comparison circuit 29, in each case 1/s-times the voltage induced in a winding phase which is advanced by half an a period with respect to the currently current-conducting winding phase of the armature winding 12 is present at the output of the second multiplexer 47, and thus at the second comparison input 292 of the comparison device 29, in each case 1/s-times the voltage is present which lags the voltage present at the first comparison input 291 directly, that is to say by a proportion of the phase period corresponding to the number of phases of the armature winding, in this case 90°. If, for example, winding phase $w_1$ is conducting current which presupposes that the count of the ring counter 38 is "1" and at the counting output 1 a control signal for the power transistor 15 is present, individual switches 403 and 474 of the multiplexers 40, 47 are actuated and at the first comparison input 291 of the comparison device 29 1/s-times the voltage drop $U_3$ across current valve 17 is present and at the second comparison input 292 1/s-times the voltage $U_4$ drop across the current valve 18 connected to the lagging phase $w_4$ is present. If winding phase $w_2$ is conducting current, 1/s-times the voltage drop $U_4$ is present at the first comparison input 291 and 1/s-times the voltage drop $U_1$ is present at the second comparison input 292, and so forth.

Comparison circuit 29 exhibits a first comparator 34, the inverting input of which is connected to the first comparison input 291 and the non-inverting input of which is connected to the second comparison input 292. The output of the comparator 34 is connected to one input of the AND gate 35. The comparison device 29 further includes a second comparator 39 the non-inverting input of which is connected to the first comparison input 291 and the inverting input of which is connected to the third comparison input 293 of the comparison device 29. The output of the comparator 39 is connected to the second input of the AND gate 35. The first comparator 34 outputs a logical "1" signal for as long as the voltage at the second comparison input 292 is greater than that at the first comparison input 291. The comparator 39 outputs a logical "1" signal if the voltage at the first comparison input 291 is greater than the voltage at the third comparison input 293. This voltage at the third comparison input 293 corresponds to k/s-times the direct current voltage $U_S$, constant k being selected to be greater than 1, preferably between 1.05 and 1.1. The factor s is dimensioned to be greater than or equal to the constant k. As soon as the two comparators output a logical 1 signal, a trigger signal passes via the AND gate 35 to the input of the monostable flipflop 37 via an OR gate 36 inserted between the AND gate 35 and the trigger input of the monostable flipflop 37. The positive edge of the trigger signal switches the monostable flipflop 37 into its quasistable state in which the Q output of the monostable flipflop 37 assumes a logical 1; The positive edge of the logical 1; signal at the Q output of the monostable flipflop 37 forms a counting pulse which increments the ring counter 38 via the counting input. In addition, the $\overline{Q}$ output of the monostable flipflop 37 is fed back to a third input of the AND gate 35. This has the result that during a gating-out period corresponding to the dwell time or stay time of the monostable flipflop 37 in its quasistable state, the difference voltages occurring when the winding phases $w_1$–$w_4$ are switched over, do not lead to unintentional advancing of the ring counter 38 before the next defined switch-over condition has been reached.

The switching-over conditions for the self control of the motor are illustrated in FIG. 2. If, for example, current valve 18 is conducting and thus the winding phase $w_4$ of the armature winding 12 is conducting current, and if the voltage $U_3$ at the output of the multiplexer 47 and thus at the second comparison input 292 of the comparison device 29 exceeds the voltage $U_2$ at the output of the multiplexer 40 and thus at the first comparison input 291, and if the condition exists that the voltages $U_2$ at the first comparison input 291 is greater than the voltage at the third comparison input 293, that is to say is greater than k/s-times the direct current voltage $U_S$, the state of the trigger input of the monostable flipflop 37 changes from a logical 0; to a logical 1; Thus, the monostable flipflop 37 changes into its quasistable state for the stay time and the Q output of the monostable flipflop 37 changes its state from a logical 0; to a logical 1; The counter 38 is advanced and assumes its counting state "1" in which a positive control voltage occurs at output 25. This control voltage is present at the base of the power transistor 15 so that this transistor conducts and a current flows from the positive potential 13 via the winding phase $w_1$ to the zero potential 14. The voltage drop across the power transistor 15 is almost zero for an phase angular range of about 90° in the case of the four-phase armature winding (with an even-numbered n-phase armature winding, this phase angular range would be equal to the corresponding fracture of 360° corresponding to the number of phases). The angular range within which the switching conditions described above are given for the ring counter switching device 19 is marked by S in FIG. 2.

At the same time as the count of the ring counter changes from "4" to "1", the multiplexers 40, 47 are switched over. Now 1/s-times the value of the voltage drop $U_3$ is present at the first comparison input 291 of the comparison device 29 and 1/s-times the voltage drop $U_4$ is present at the second comparison input 292. The process described above is repeated as soon as the voltages at the comparison input 292 exceeds the voltage at the comparison input 291 and the voltage at the first comparison input 291 is greater than the voltage at the third comparison input 292. The ring counter 38 is incremented by another step and a positive control potential is now present at the output 26 of the control block 20. The power transistor 16 becomes conductive and a voltage $U_2$ across the power transistor 16 drops to almost zero. This process is repeated in a cyclic sequence. In the areas marked by S in FIG. 2, the switching condition for motor self control is given. It is restricted to a range of less than 45° of the electrical phase.

For the case where the stepping-on condition does not occur in the self-control range S of the motor, that is to say where no significant voltage is inducted due to standstill of the rotor 11 or a very slow forward or reverse motion of the rotor 11, an auxiliary counting pulse generator is provided which generates an additional counting pulse when no counting pulse occurs within a predetermined waiting period and both voltages present at the two comparison inputs 21 and 292 are located between the k/s and 1/ks data points. The auxiliary counting pulse generator consists of the monostable flipflop 37, the OR gate 36 and an auxiliary trigger signal generator 41. After a predetermined waiting period as elapsed, the auxiliary trigger signal generator 41 generates, after a counting pulse has occurred, a trigger signal which passes via the OR gate 36 to the trigger input of the monostable flipflop 37. In this arrangement, the waiting time is dimensioned to be greater than the repetition time of the two successive counting pulses with a rotating motor 11. Between the auxiliary trigger signal generator 41 and the OR gate 36, a second gate constructed as AND gate 42 is arranged which is controlled by the comparison device 29.

The comparison device 29 also includes a third comparator 43 the non-inverting input of which is connected to the fourth comparison input 294 of the comparison device 29 at which 1/k.s-times the direct current voltage $U_S$ is present, k again being dimensioned to be greater than 1, preferably between 1.05 and 1.1, and s being dimensioned to be greater than or equal to k. The inverting input of the comparator 43 is connected to the first comparison input 291. The comparator 43 applies a blocking signal to a second gate 42 for as long as the voltage at the first comparison input 291 is lower than the voltage at the fourth comparison input 294. The comparison device 29 furthermore includes a fourth comparator 44, the non-inverting input of which is connected to the second comparison input 292 and the inverting input of which is connected to the third comparison input 293 of the comparison device 29. The fourth comparator 44 compares the voltages at these two comparison inputs and supplies a blocking signal to the second gate section 42 for as long as the voltage at the second comparison input 292 is greater than at the third comparison input 293. Finally, the comparison device 29 also exhibits a fifth comparator 45, the inverting input of which is connected to the second comparison input 292 and the non-inverting input of which is connected to the fourth comparison input 294 of the comparison device 29. The fifth comparator 45 compares the two voltages and supplies a blocking signal to the second gate 42 for as long as the voltage at the second comparison input 292 is greater than that at the fourth comparison input 294. Finally, the second comparator 39 also applies a blocking signal to the second gate 42 for as long as the voltage at the first comparison input 291 exceeds that at the second comparison input 292. In detail, a NOR gate 46 having four inputs is provided for this purpose, the output of which is connected to one input of the second gate constructed as AND gate 42. Each of the inputs of the NOR gate 46 is connected to one of the outputs of the comparators 39, 43, 44 and 45.

Due to these comparators 39, 43–45 of the comparison device 29, a trigger signal from the auxiliary trigger signal generator 41 can only reach the monostable flipflop 37 if the blocking signals of the comparison device 29 are missing. This range in which the AND gate 42 is block due to lack of the blocking signals (logical 1; signal at the output of the NOR gate 46)is drawn with dot-dashed lines in FIG. 2 and established by the boundaries $k.U_S$ and $k^{-1}.U_S$. Thus, the enabling of the auxiliary trigger signal is dependent on the rotational movement of the rotor 11. Only when the voltages $U_1$–$U_4$ induced by the rotor are below a minimum value and thus the voltages occurring across the winding phases $w_1$–$w_4$ and current valves 15–19 lie within the range $k^{-1}.U_S$ and $k. U_S$, can an auxiliary trigger signal generated by the auxiliary trigger signal generator 41 pass to the monostable flipflop 37 and here cause a counting pulse for the ring counter 38 to be triggered.

The auxiliary trigger signal generator 41 includes a counting pulse generator 48 and a counter 49 having a reset input R and counting output $Q_n$ which, on the one hand, is fed back via an OR gate 50 to the counting input of the counter 49 and, on the other hand, is connected to the second input of the AND gate 42. The output of the counting pulse generator 48 is connected to the other input of the OR gate 50. The reset input R of the counter 49 is connected to the Q output of the monostable flipflop 37 so that the counter 49 is reset with each counting pulse reaching the ring counter 38. The counting pulse repetition rate of the counting pulse generator 48 and the counting capacity of the counter 49 determine the waiting time after which an auxiliary trigger signal occurs in the form of a logical 1; signal. In this arrangement, the waiting time must be dimensioned to be longer than the repetition time between two counting pulses occurring during motor self control.

If self-control of the motor is missing due to the induced armature voltage being too low due to stand-still or very slow forward or reverse motions of the rotor 11, the auxiliary trigger signal switches the monostable flipflop 37 into its unstable state, thus advancing the ring counter 38 by one step, on the one hand, and, on the other hand, resetting the counter 49 to zero. Advancing the ring counter 38 causes the rotor 11 to be rotated further and the motor 10 to be accelerated at maximum torque up to operational speed if direction of rotation, count and switching conditions for self control fit together. Due to the controlled enabling of the auxiliary trigger signal by the comparison device 29, a continuing slow rotation of the rotor 11 against the required direction of rotation is prevented which could occur without the controlled enabling of the auxiliary trigger signal at the rate of the waiting time.

Figure 4:
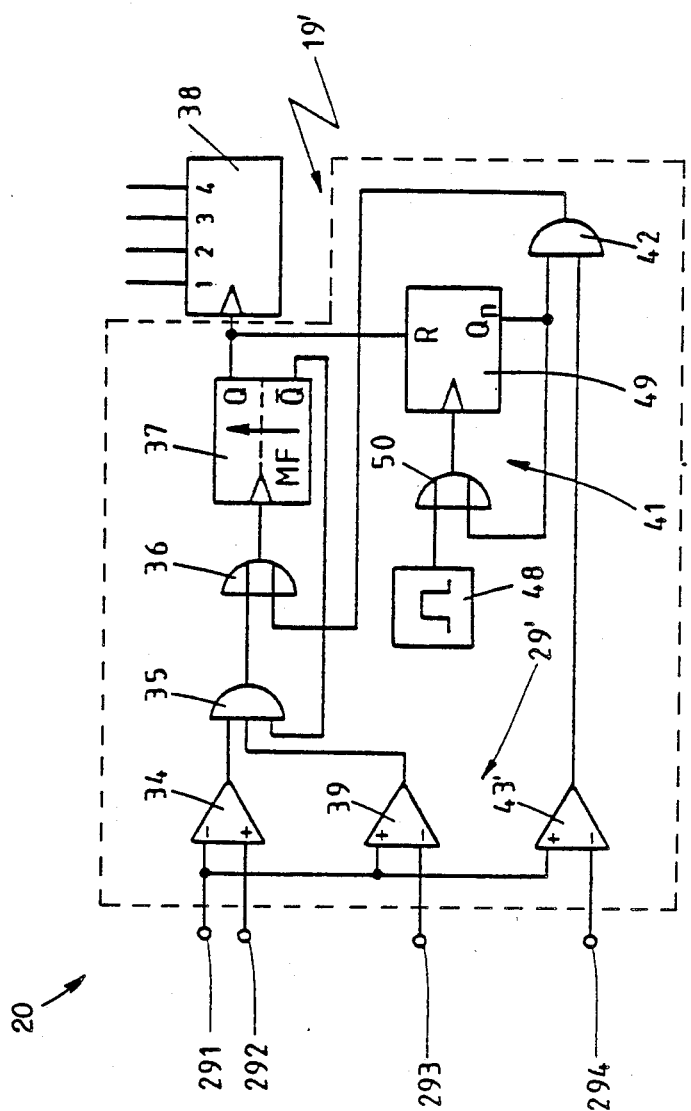

The ring counter switching device 19', shown in in FIG. 4, in accordance with a further illustrative embodiment, largely corresponds to the ring counter switching device 19 shown in FIG. 3 so that identical components are provided with identical reference symbols. In contrast to the embodiment according to FIG. 3, the comparison device 29' in the ring counter switching device 19' only includes a total of three comparators, these being the first comparator 34, the second comparator 39 and the third comparator 43'. The second gate again constructed as AND gate 42 and controlled by the comparison device 29' is directly connected to the output of the third comparator 43'. At the third comparator 43', inverting and non-inverting output are interchanged so that the non-inverting input is connected to the first comparison input 291 and the inverting input is connected to the fourth comparison input 294 of the comparison device 29'. The comparator 43' generates a logical 0; signal as blocking signal as long as the voltage at the fourth comparison input 294 is higher than that at the first comparison input 291. However, as soon as the voltages at the first comparison input 291 exceeds the voltage at the fourth comparison input 294, the AND gate 42 is set by a logical 1; signal and after the waiting time has elapsed, the monostable flipflop 37 is set by an auxiliary trigger signal generated by the auxiliary trigger signal generator 41 which, in turn, triggers a counting pulse for advancing the ring counter 38. In this embodiment, the auxiliary trigger signal is blocked for as long as the rotor 11 rotates at a minimum speed within a limited angular range. This means that as long as the voltage at the first comparison input 291 is lower than the voltage value $(k.s)^{-1} \cdot U_S$, the AND gate 42 is blocked since advancing the ring counter 38 is harmful for forward running in this range and does not retard any reverse running which may be present.

The circuit arrangement for operating a multi-phase synchronous motor on a direct current voltage mains has been described with the aid of a four-phase synchronous motor. The circuit arrangement specified is suitable for operating any n-phase synchronous motor, in which context n is an arbitrary even number.

The basic principle of this circuit arrangement can also be used for operating n-phase synchronous motors in which n is an arbitrary odd-number. The basic principle can be seen in the fact that the ring counter switching device 19 generates counting pulses for the ring counter 38 is known manner from the comparison of two voltages dropped across blocked current valves, and that, in addition, the ring counter switching device 19 is supplied with at least one present voltage value which is derived from the mains direct voltage $U_S$. In this arrangement, the ring counter switching device 19 is constructed in such a manner that a counting pulse derived from the voltage comparison can reach the ring counter 38 only for as long as the voltage, which decreases in the course of time, of the two voltages to be compared is greater than the present voltage value. The blocking signals for the auxiliary trigger signals are also obtained in the same manner from a corresponding comparison of the mains direct voltage with the voltages of the armature winding phases.

In addition, further modifications and variants of the circuit arrangement described are possible. Thus, with a low operating voltage of the motor or with sufficient electric strength of the multiplexers 40, 47, the voltage dividers 30, 31 can be arranged between the outputs of the multiplexers 40 and 47 and the two comparison inputs 291 and 292. This makes it possible to save two voltage dividers.

Instead of the voltage-comparing comparators, current-comparing comparators can also be used and, correspondingly, current-weighting resistors can be used instead of voltage dividers.

In another variant, the reversing switching device 51 can be constructed in such a manner that change-over switches are exclusively provided in the control lines between the ring counter 38 and the multiplexers 40, 47, which makes it possible to perform a reversal of direction of rotation in corresponding manner.

Fundamentally, it is also possible to omit the multiplexers 40, 47 and to perform all voltage comparisons to be carried out in permanently assigned comparators. A logical selection network must then be provided at the outputs of the comparators, the signal paths of which network are controlled by the outputs of the ring counter. However, such a variant is very complex with regard to the components required.

We claim:

1. Circuit arrangement for operating a multi-phase synchronous motor on a direct current voltage mains, comprising a number of current valves which corresponds to the number of phases of the armature winding of the synchronous motor, each of said current valves being connected in series with an assigned phase of the armature winding to the direct current voltage source; a ring counter, having a counting input and a plurality of parallel counting outputs, each counting output being connected to a control input of an assigned control valve and when the count at the respective counting outputs in the ring counter cyclically assumes high value, the corresponding current valve is switched over into conduction; a ring counter switching device including a comparison device for comparing voltage drops across two blocked current valves, the first voltage drop being in opposite electrical phase relative to the alternating voltage induced in the phase of the armature winding which is connected to the currently conducting current valve, and the second voltage drop being in opposite electrical phase relative to the alternating voltage induced in the phase of the armature winding which is connected to the subsequent current valve when viewed in the direction of rotation of the motor; said comparison device generating a counting pulse when said second voltage drop exceeds said first voltage drop; means for deriving a set voltage value (k . U$_S$) from the direct voltage of said source; and said ring counter switching device further including means for delivering said counting pulse to said counting input of the ring counter for as long as said first voltage drop exceeds said set voltage value (k . U$_S$).

2. Circuit arrangement according to claim 1, characterized in that the set voltage is dimensioned to be equal to k-times the mains direct current voltage (U$_S$), k being selected to be greater than 1, preferably between 1.05 and 1.1.

3. Circuit arrangement according to claim 2, wherein the ring counter switching device (19) includes an auxiliary counting pulse generator (41, 36, 37) which generates an additional counting pulse when no counting pulse occurs within a predetermined waiting time, and means for blocking said auxiliary counting pulse generator for as long as at least one of the voltage drops (U$_1$ to U$_4$) to be compared exceeds a first minimum value or is below a second minimum value.

4. Circuit arrangement according to claim 2, characterized in that the first minimum value is selected to be equal to the set voltage value (k . U$_S$).

5. Circuit arrangement according to claim 4, wherein the second minimum value corresponds to the k-fold part of the direct current mains voltage (U$_s$).

6. Circuit arrangement according to claim 3 for a synchronous motor having an armature winding exhibiting an even number of phases, wherein said comparison device has at least three comparison inputs (291–293) and an edge-triggered monostable flipflop (37), which is connected via a first gate (35) to the comparison device (29), the quasi-stable Q output of the monostable flipflop is connected to the counting input of the ring counter (38), at the first comparison input (291) of the comparison device (29) a voltage corresponding to 1/s-times said first voltage drop is present, at the second comparison input (292) a voltage corresponding to 1/s-times said second voltage drop is present and at the third comparison input (293) a voltage corresponding to 1/s-times said set voltage value (k . U$_s$), and the comparison device (29) includes a first comparator (34) which compares the voltage at the first and second comparison input (291, 292) and outputs a trigger signal for the monostable flipflop (37) for as long as the voltage at the second comparison input (292) is greater than that at the first comparison input (291), and a second comparator (39) which compares the voltages at the first and third comparison input (291, 293) with each other and supplies a gate enable signal to said first gate (35) for as long as the voltage at the first comparison input (291) is greater than that at the third comparison input (293).

7. Circuit arrangement according to claim 6, characterized in that the auxiliary counting pulse generator of the ring counter switching device (19) consists of the monostable flipflop (37) and of an auxiliary trigger signal generator (41) which is connected to the trigger input of the monostable flipflop (37) via a second gate (42) and which generates a trigger signal for the monostable flipflop after the occurrence of the last counting pulse after the waiting time has elapsed and that the comparison device (29) controls the second gate (42).

8. Circuit arrangement according to claim 7, wherein the auxiliary trigger signal generator (41) includes a counter (49) having a counting input, a reset input (R) and a counting output (Q$_n$) at which a trigger signal is generated when a predetermined count (n) has been reached, a counting pulse generator (48) connected to said counting input to clock said counter (40), and said counting output being connected to said counting input and to an input of said second gate (42).

9. Circuit arrangement as defined in claim 8, wherein said second comparator (39) applies a gate blocking signal to said second gate (42) for as long as the voltage at the first comparison input (291) is greater than that at the third comparison input (293).

10. Circuit arrangement according to claim 9, characterized in that the comparison device (29) exhibits a fourth comparison input (294) at which a voltage is present which is dimensioned to be equal to 1/k.s-times the system direct voltage (U$_S$) and a third comparator (43) which compares the voltages at the first and fourth comparison input (291, 294) with each other and applies a blocking signal to the second gate (42) for as long as the voltage at the first comparison input (291) is lower than that at the fourth comparison input (294).

11. Circuit arrangement according to claim 10, characterized in that the comparison device (29) exhibits a fourth comparator (44) which compares the voltages at the second and third comparison input (292, 293) with each other and applies a gate blocking signal to the second gate (42) as long as the voltage at the second comparator input (292) is greater than that at the third comparison input (293).

12. Circuit arrangement according to claim 11, characterized in that the comparison device (29) exhibits a fifth comparator (45) which compares the voltages at the second and fourth comparison input (292, 294) with each other and applies a gate blocking signal to the second gate (42) for as long as the voltage at the second comparison input (292) is lower than that at the fourth comparison input (294).

13. Circuit arrangement according to claim 12, characterized in that the monostable flipflop applies a gate blocking signal to the first gate (35) for the duration of its quasistable state.

14. Circuit arrangement according to claim 13, characterized in that the first and second gates are constructed as AND gates (35, 42), that of the inputs of the AND gate (35) forming the first gate, one input is connected to the first comparator (34), one input is connected to the second comparator (35) and one input is connected to the inverting output (Q̄) of the monostable flipflop (37), that of the inputs of the AND gate (42) forming the second gate, one is connected to the counting output (Q$_n$) of the counter (49) and the other one is connected to the output of a NOR gate (46), that of the comparators (34, 39, 43, 44, 45), the first comparator (34) is connected with its inverting input to the first comparison input (291) and with its non-inverting input to the second comparison input (292), the second comparator (39) is connected with its non-inverting input to the first comparison input (291) and with its inverting input to the third comparison input (293), the third comparator (43) is connected with its inverting input to the first comparison input (291) and with its non-inverting input to the fourth comparison input (294), the fourth comparator (44) is connected with its non-inverting input to the second comparison input (292) and with its inverting input to the third comparison input (293), and the fifth comparator (45) is connected with its inverting input to the second comparison input (292) and with its non-inverting input to the fourth comparison input (294) and that the outputs of the second, third, fourth and fifth comparator (39, 42, 44, 45) are connected to assigned inputs of the NOR gate (46).

15. Circuit arrangement according to claim 14, characterized in that the first and second comparison inputs (291, 292) of the comparison device (29) are connected with in each case one output of two multiplexers (40, 47), that voltage dividers (30–33) are connected in parallel with the current valves (15–18) and the inputs of the two multiplexers (40, 47) are connected to in each case one divider tap of voltage dividers (30–33), that the inputs of the multiplexers (40, 47) are connected to the parallel counting outputs of the ring counter (38) and that the two multiplexers (40, 47) are synchronously controlled in such a manner that the inputs, connected to said voltage dividers (30–33), of the two multiplexers (40, 47) are displaced by one input with respect to one another in the switching sequence.

16. Circuit arrangement according to claim 15, characterized by a switching device (51) for reversing the direction of rotation of synchronous motor.

17. Circuit arrangement according to claim 16 for a synchronous motor having a four-phase armature winding, characterized in that the switching device (51) exhibits four change-over switches (511–514), that two change-over switches (511, 512) are arranged between the divider taps of two voltage dividers (31, 33) and the connected inputs of the two multiplexers (40, 47) for alternate exchanging of the connected inputs, that two change-over switches (513, 514) are arranged between two counting outputs (2, 4) of the ring counter (38) and the connected control inputs (26, 28) of the current valves (16, 18), that all change-over switches (511–514) are synchronously switched and that the voltage dividers (31, 33) or current valves (16, 18), which are connected to the change-over switches (511–514), are associated with the phases of the armature winding (12).

18. Circuit arrangement as defined in claim 1, wherein said ring counter switches-on the corresponding current valve during a range of electrical phase angles which is less than 360° divided by the number of phases of the armature winding.

* * * * *